United States Patent [11] 3,603,243

| [72] | Inventor | Robert D. Foster |
| | | 202 Womble, Camden, Ark. 71701 |
| [21] | Appl. No. | 43,366 |
| [22] | Filed | June 4, 1970 |
| [45] | Patented | Sept. 7, 1971 |

[54] MACHINE FOR PREPARING SHELL-LESS HARD COOKED EGGS
33 Claims, 11 Drawing Figs.

[52] U.S. Cl. .................................................. 99/355,
62/374, 99/113, 99/404, 99/407, 99/416, 99/443
C, 99/448, 146/2 E, 165/120, 198/33
[51] Int. Cl. ........................................................ A47j 29/00
[50] Field of Search ............................................ 99/352,
355, 403, 404, 407, 440, 443 C, 409, 446, 448,
443 R, 113, 416; 198/33; 165/65, 120; 62/374;
146/2 E

[56] References Cited
UNITED STATES PATENTS

| 1,159,537 | 11/1915 | Shields | 99/404 |
| 2,575,608 | 11/1951 | Williams | 99/355 |
| 2,603,039 | 7/1952 | Slocum et al. | 99/443 X |
| 3,147,689 | 9/1964 | Sakamoto et al. | 99/355 X |
| 3,216,828 | 11/1965 | Koonz et al. | 99/113 |

*Primary Examiner*—Billy J. Wilhite
*Attorney*—Dunlap, Laney, Hessin & Dougherty ABSTRACT: A machine for preparing shell-less hard cooked eggs which includes conveyor means for moving a plurality of eggs along a predetermined path, the path extending through a heated fluid for cooking the eggs, and through a freezing zone for freezing a portion of the eggs just inside the shell. After traversing the freezing zone, the eggs move down a chute which is configured to seriate the eggs. A revolving egg cracking device which carries a pickup element picks up each egg in succession and cracks the shell in a number of places by rolling the eggs across a number of serated bars. A conveyor is positioned adjacent the cracking device for receiving cracked eggs therefrom and moving them to a discharge point. This conveyor includes a plurality of rollers which support the eggs discharged from the cracking device, and mechanism is provided for alternately driving these rollers, first in one direction of rotation, then in the other direction of rotation, as the eggs are moved in translational movement by the conveyor. Liquid spraying apparatus is provided over the conveyor carrying the rollers for impinging a liquid upon the cracked eggs to remove the shells therefrom.

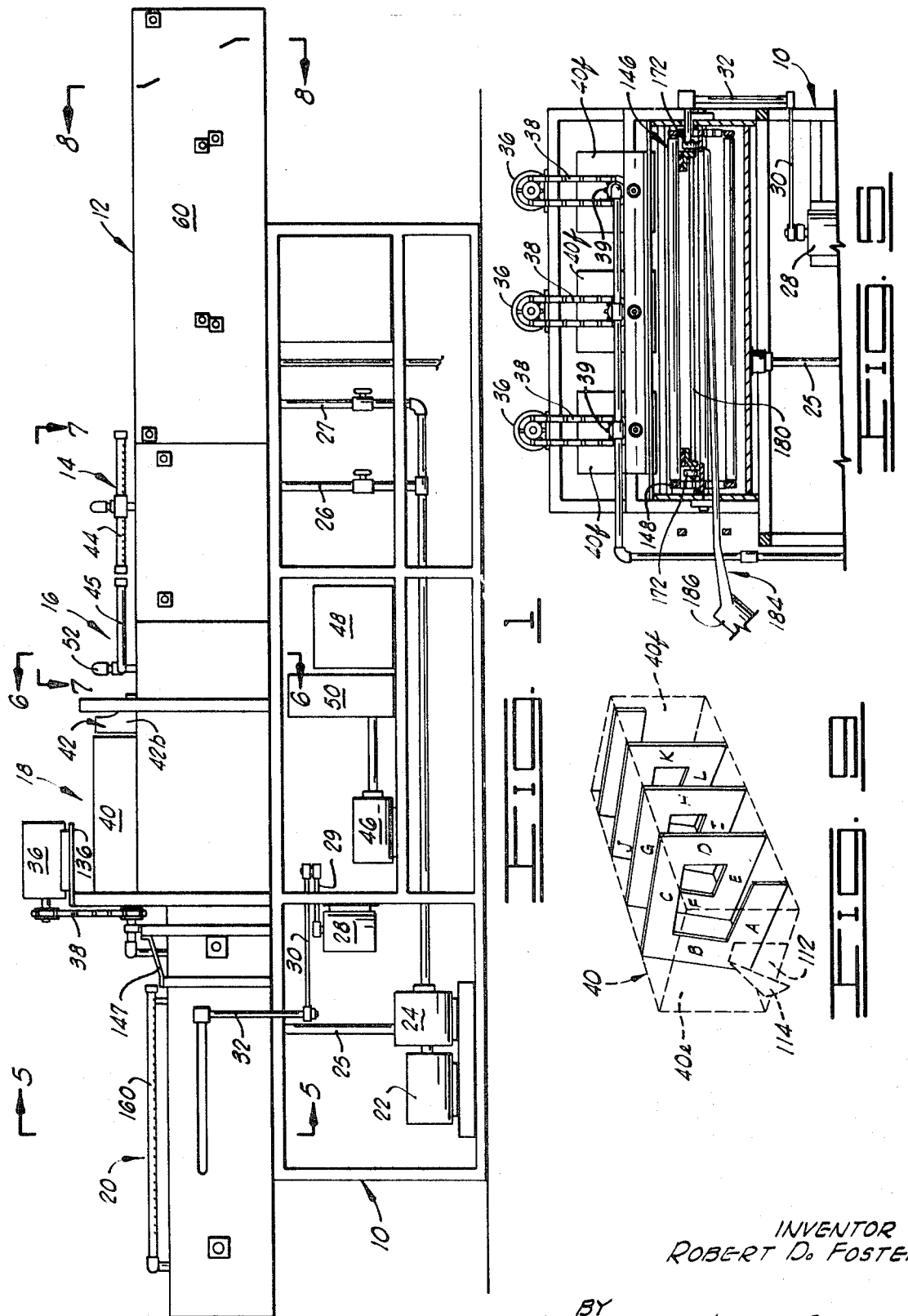

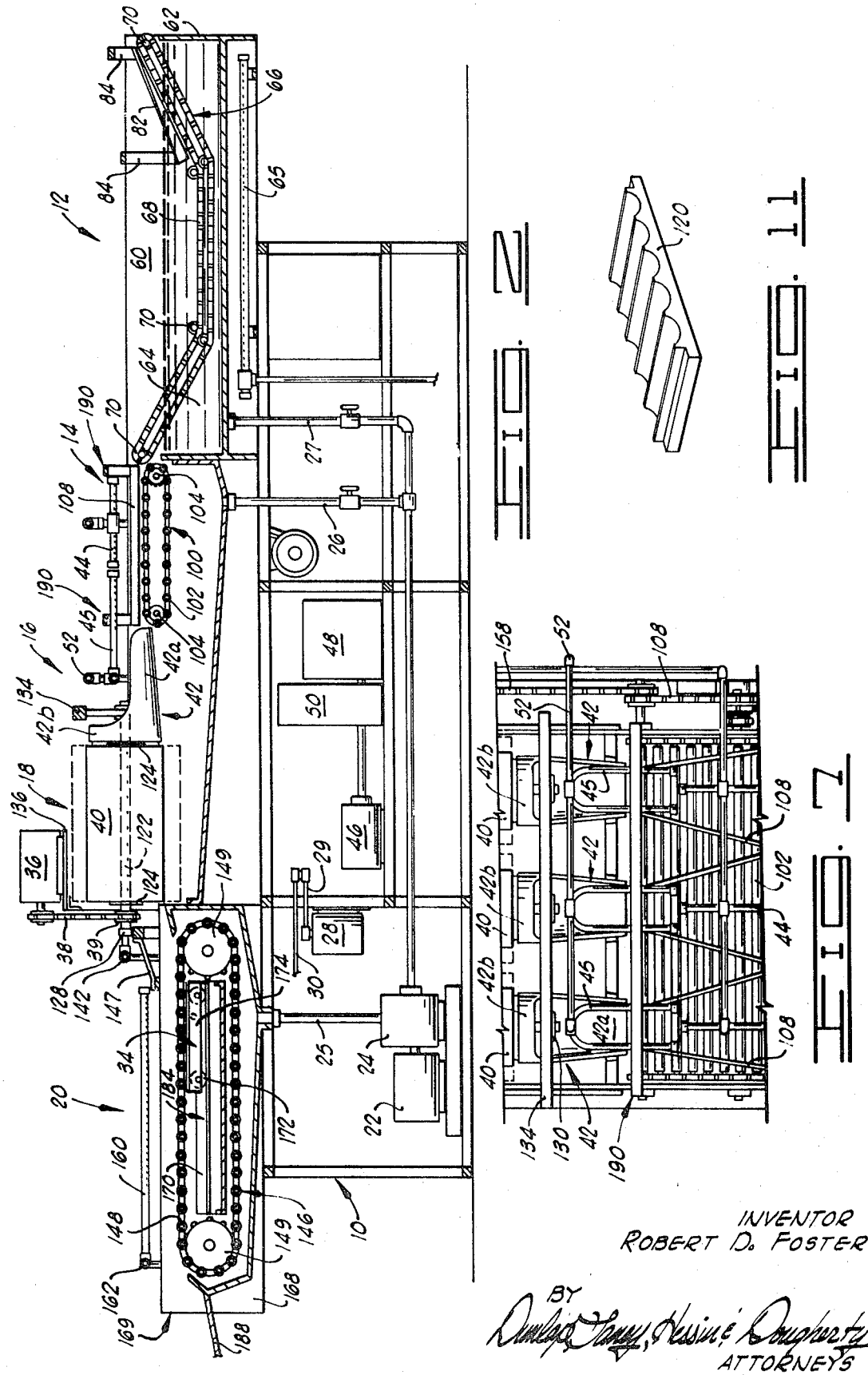

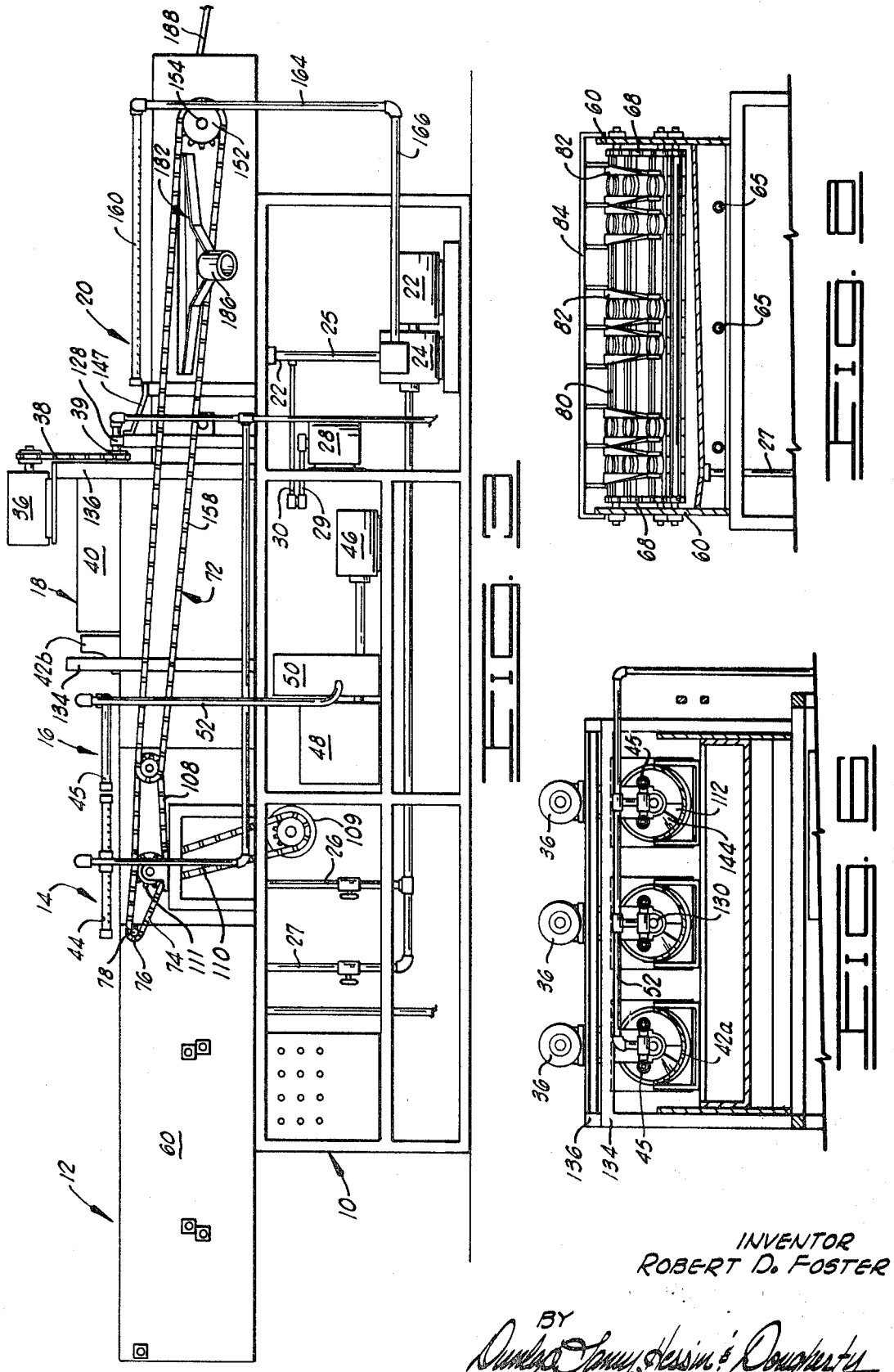

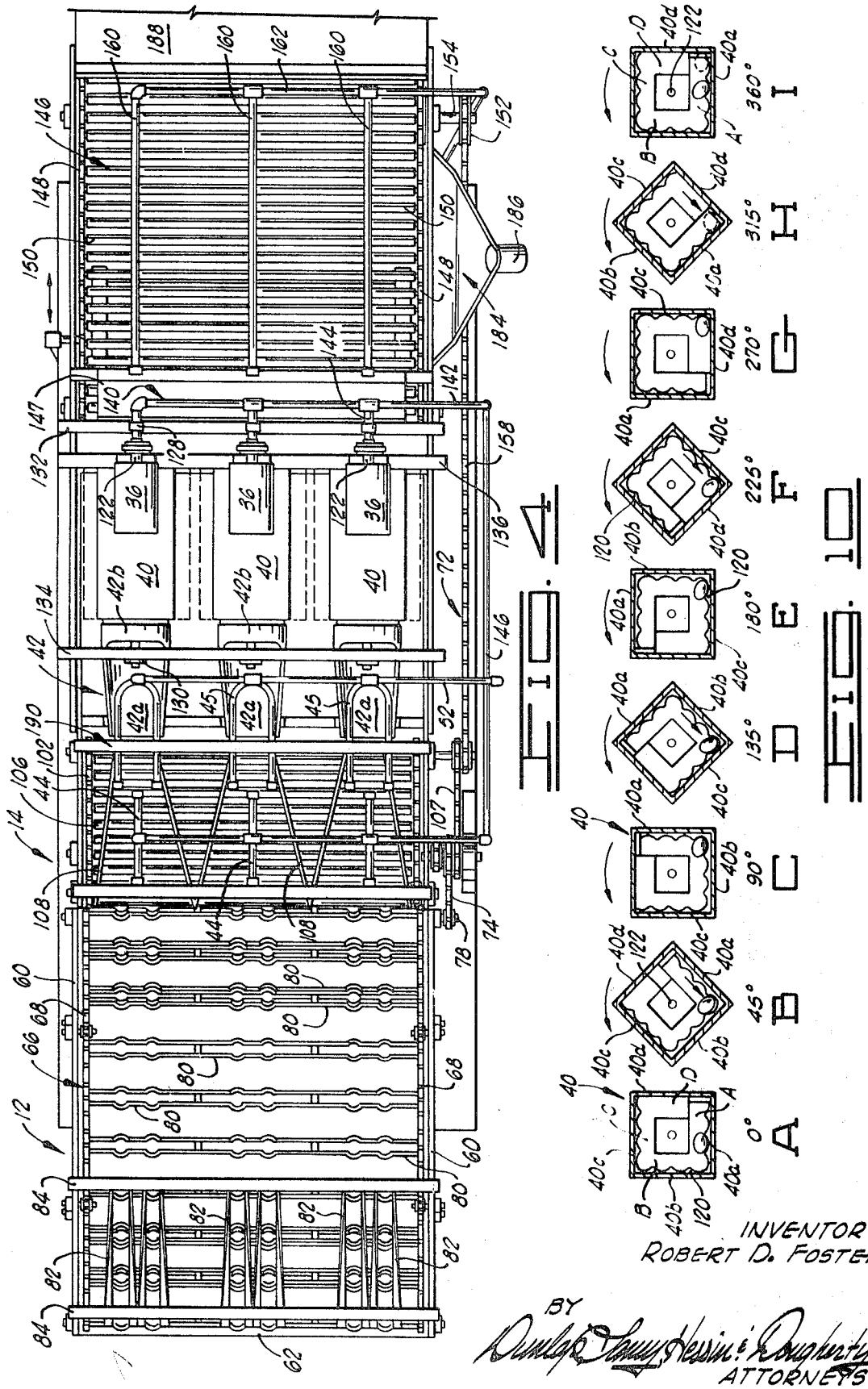

3,603,243

1

MACHINE FOR PREPARING SHELL-LESS HARD COOKED EGGS

BACKGROUND OF THE INVENTION

1. Field of the Invention

This invention relates to apparatus for processing eggs, and more particularly, but not by way of limitation, to machinery for automatically cooking and shelling eggs to yield hard cooked shell-less eggs.

2. Brief Description of Prior Art

Processes have previously been used for producing shell-less hard cooked eggs in quantity for commercial marketing. These processes commonly include a cooking step and a shell removal step. It has been endeavored to render such processes fully automatic, but even in the most advanced processes now utilized, a significant portion of the eggs processed are damaged beyond suitability for the intended market. One of the most difficult aspects of the process is that of cracking and removing the shell from the eggs without pressing bits of shell into the white of the eggs, and without gouging or chipping the cooked interior of the egg.

SUMMARY OF THE PRESENT INVENTION

The present invention provides apparatus for preparing shell-less hard cooked eggs by the use of which well over 90 percent of the eggs processed are unblemished and entirely suitable for the intended market. The cooking, and also the cracking and removal of the shells of the eggs, are automatically effected.

Broadly described, the apparatus of the invention comprises conveyor means for moving a plurality of eggs along a predetermined path, a cooking bath for hard cooking the eggs as they are moved therethrough by the conveyor means, freezing means for freezing an internal portion of the eggs moving on the conveyor means, and a revolving egg-cracking device which includes one or more pickup elements for picking up eggs and moving them into the cracking device. The egg cracking device preferably includes a housing which has a number of intersecting sides carrying serrated bars which, as the housing is rotated about a central axis, revolve about this axis. The eggs are rolled across these bars within the housing to crack the shells, and are then discharged from the egg cracking device onto a shell removal conveyor which moves the eggs to a discharge point. The shell removal conveyor includes a plurality of rollers mounted for rotation about a horizontal axis and positioned sufficiently close to each other so that the eggs cannot pass therebetween. Beneath the rollers of the shell removal conveyor is a reciprocating carriage which contacts the lower surface of the rollers, and which, by its reciprocation, drives the rollers in rotation, first in one direction and then the other. This action of the rollers on the eggs extends and completes the thorough cracking of the shells and also mechanically enhances the removal of the shells. While the eggs are on the rollers of the discharge conveyor, a spray of a saline or chlorinated solution is directed against the eggs, and by impingement thereon in conjunction with the described rolling action, removes the cracked shells from the cooked eggs.

It is an object of the present invention to provide apparatus for automatically cooking and then cracking and removing the shells from fresh eggs so as to provide hard cooked eggs ready for packing and shipment, and for immediate marketing.

A further object of the invention is to provide an apparatus by the use of which, eggs may be first hard cooked, then a small portion of the egg adjacent the shell frozen, then the egg cracked while the portion described is in the frozen state, and finally, the shell is completely removed from the egg.

An additional object of the invention is to provide an apparatus for preparing shell-less hard cooked eggs in which the shells have been automatically removed from the eggs after cooking without pressing bits of the shell into the albumin or white of the egg, and without damaging the egg.

2

Another object of the invention is to provide an apparatus for preparing shell-less hard cooked eggs in which the eggs are cooked and shelled completely automatically, which apparatus is capable of yielding over 90 percent of the eggs in a condition satisfactory for sale in the intended market.

Other objects and advantages will become apparent as the following detailed description of the invention is read in conjunction with the accompanying drawings which illustrate the invention.

BRIEF DESCRIPTION OF THE DRAWINGS

FIG. 1 is a side elevation view of apparatus constructed in accordance with the invention for preparing shell-less hard cooked eggs.

FIG. 2 is a sectional view taken along line 2—2 of FIG. 4.

FIG. 3 is a side elevation view of the apparatus illustrated in FIG. 1 as the apparatus appears when viewed from the side opposite that shown in FIG. 1.

FIG. 4 is a plan view of the apparatus illustrated in FIG. 1.

FIG. 5 is a sectional view taken along line 5—5 of FIG. 1

FIG. 6 is a sectional view taken along line 6—6 of FIG. 1.

FIG. 7 is a sectional view taken along line 7—7 of FIG. 1.

FIG. 8 is a sectional view taken along line 8—8 of FIG. 1.

FIG. 9 is a schematic illustration of the construction of one of the cracker housings used in the apparatus of the invention showing the location of guide plates disposed interiorly of the housing.

FIGS. 10A–10I are diagrammatic illustrations of sequential positions of one of the cracker housings during its rotation and showing an egg disposed therein.

FIG. 11 is a perspective view of one of the serrated cracker bars used in the cracker housing.

Referring initially to FIG. 1 of the drawings which illustrates the apparatus of the invention in side elevation, shown there is a framework 10 of any suitable type used to support the apparatus in an elevated position with respect to the floor or other supporting surface. Eggs which are to be processed in the apparatus of the invention proceed through the apparatus from the right side to the left side thereof as the machine is illustrated in FIG. 1. The apparatus may be considered as functionally sectioned into a cooking section, designated generally by reference numeral 12, a precooling section, designated generally by reference numeral 14, a freezing section, designated generally by reference numeral 16, a shell cracking section, designated generally by reference numeral 18, and a shell removal and cleaning section, designated generally by reference numeral 20.

As further shown in FIGS. 1 and 2, a motor 22 and pump 24 are provided for removing saline or chlorinated water from the shell removal and cleaning section 20 via a pipe 25. The pump 24 can also be utilized for removing water from the precooling section 14 and from the cooking section 12 via pipes 26 and 27, respectively, according to the manipulation of certain suitable valving (not shown). As is further shown in FIGS. 1–3, a motor 28 functions through a crank arm 29, pitman 30 and connecting arm 32 to drive a carriage 34 in reciprocation in a manner and for a purpose hereinafter described. A plurality of motors 36 are mounted on the upper side of the apparatus each for driving a chain 38 which in turn drives a suitable sprocket 39 to rotate a shell cracker housing 40. Chutes or channels for channeling eggs from the freezing section 16 to the egg cracking section 18 are designated by reference numeral 42.

Perforated piping 44 is provided for delivering a spray of cooled liquid to eggs moving through the precooling section 14 of the apparatus. Spray heads 45 are also provided for charging a refrigerant against eggs moving through the freezing section 16. A motor 46 is mounted on the framework 10 and drives a compressor 48 which is utilized in conjunction with an evaporator 50 for delivering a refrigerant via the pipe 52 to the spray heads 45.

The several sections of the apparatus of the invention are illustrated in greater detail in FIGS. 2 and 4. Thus, in these figures, it will be perceived that the cooking section 12 is in the form of an open topped housing having side walls 60 and an end wall 62 which function to contain a heated liquid 64, such as water. A suitable gas burner pipe 65 extends beneath the housing. Mounted in the housing between the side walls 60 is a conveyor assembly designated generally by the reference numeral 66. The conveyor assembly 66 includes a pair of substantially parallel endless chains 68 passed over a plurality of sockets 70, one of which is driven by a suitable drive system designated generally by reference numeral 72 (see FIG. 3). The drive system 72 includes a chain 74 which extends over a pulley 76 keyed to a shaft 78 which carries sprockets 70 driving each of the endless chains 68. Others of the sprockets 70 are idler sprockets and are provided along the chains 68 to guide the chains, and to provide the geometric configurations to the chains which are depicted in FIG. 2. The configurations of the chains 68 as shown in FIG. 2 thus provides an inclined feed run, a bath traversing run, and an upwardly inclined discharge run on the opposite side of the bath traversing run from the inclined feed run.

Extending between, and connected to, the parallel endless chains 68 are a plurality of serpentine bars 80 which are paired to provide a plurality of egg sockets. These paired bars 80, which extend transversely across the housing of the cooking section 12 in the manner depicted in FIG. 4, define six sockets for eggs between each pair of bars. In the use of the apparatus, eggs are placed in the sockets and moved abreast of each other through the heated water provided in the cooking section 12. Machinery is commercially available for automatically setting the eggs into the several sockets provided by the paired serpentine bars 80 at the upstream end of the conveyor assembly 66. As the paired serpentine bars 80 move downwardly along the inclined feed run of the conveyor assembly 66, the eggs carried in the several sockets formed by the paired bars encounter elongated righting plates 82. The righting plates 82 are provided in pairs and are supported by suitable straps 84. The righting plates are twisted over their length so that they extend at an inclination with respect to the horizontal at their upstream ends, where they are first encountered by eggs moving on the conveyor assembly 66, and are then gradually bent into a vertical plane adjacent their downstream ends. The function of the righting plates 82 is to engage the eggs carried in the egg sockets formed by the serpentine bars 80, and to gently wedge these eggs to an upright position, rather than permitting the eggs to lay on their sides in the sockets. It is important that the eggs be moved into such an upright position so that the yolks of the eggs remain centered during the cooking, freezing, and shelling process. I have found that where such centering of the yolk is not accomplished by placing the eggs in an upright position during the cooking process, it is difficult to freeze and shell the eggs properly in certain steps carried out at downstream locations in the apparatus.

In a typical embodiment of the invention, the inclined feed run of the conveyor assembly 66 will be about 30 inches in length, the central, substantially horizontal run which passes through the heated water will be about 32 inches in length, and the upwardly inclined discharge run of the assembly will be about 30 inches in length. The heated water through which the eggs are passed is heated to a temperature of between about 160° F and about 210° F, and the speed of the conveyor assembly 66 is adjusted so that in transiting the heating water, the eggs will be hard cooked.

When the eggs have been carried to the upper end of the upwardly inclined discharge run of the conveyor assembly 66, the serpentine bars 80 are inverted as the chains 68 of the conveyor assembly pass over the sprockets 70 located at this end of the conveyor assembly. As the serpentine bars 80 are turned over in this manner, eggs are gently passed out of the conveyor assembly 66 onto another conveyor assembly designated generally by reference numeral 100. The conveyor assembly 100 includes a pair of horizontally spaced, substantially parallel endless chains 102 which pass over suitable sprockets 104, and which have mounted therebetween and extending transversely of the apparatus, a plurality of rubber coated rollers 106 which are mounted for free rotation about a horizontal axis. One of the sprockets 104 is driven by a chain 107 (see FIG. 3) which is a part of the drive system 72. The prime mover of the drive system 72 is a motor 109 which, through a chain 110, drives a sprocket 111 drivingly connected through a suitable shaft and sprockets to the chains 108 and 158.

After the eggs move onto the rollers 106, the eggs can turn or move about, upon the application thereto of any force tending to cause them to spin or rotate about their axes. This freedom of movement facilitates the precooling of the eggs while they are mounted on the conveyor assembly 100 by the direction of jets of relatively cool water against the eggs from the perforated piping 44, which piping extends over the eggs in a longitudinal direction and sprays streams of water against the eggs. To the extent that the eggs move about on the rollers 106 under the impact of the stream of water and frictional drag, cooling of the egg over its entire surface and interior is more uniform than where the eggs are held in a fixed position, and the water impinged against a localized area of the surface thereof. As the eggs move through the apparatus on the conveyor assembly 100, they are channeled and guided by paired guide plates 108 (illustrated in FIG. 4). These paired guide plates 108 function to move the eggs in each of the three pairs of eggs carried on the conveyor assembly 100 more closely to each other in a gently converging motion so that the eggs, when discharged from the conveyor assembly, enter one of the channels or chutes 42.

The channels or chutes 42 are configured as best illustrated in FIGS. 2 and 4. Thus, it will be perceived that each of the three chutes 42 provided in the apparatus has a forwardly extending scoop portion 42a which inclines downwardly slightly toward the discharge end of the machine. It will also be noted in referring to FIG. 4 that each scoop portion 42a is shaped as a cut away portion of a hollow frustum of a cone. The scoop portion 42a of each chute 42 is joined, and formed integrally, with an annular portion 42b at the downstream end of each chute.

The described configuration of each chute 42 assures that as the pair of eggs received by each chute from the conveyor assembly 100 move down the inclined scoop portion 42a of the serpentine chute, one of the eggs will advance faster than the other, and the result will be that the eggs are seriated, and one of the eggs arrives at the rear portion of the chute prior to the other. The explanation for the seriating action of the chutes 42 lies in the fact that each of the eggs in each pair of eggs which enter the chute 42 has a different weight from the other egg in the pair, and the action of gravity on the eggs results in one advancing faster than the other. Moreover, the generally rounded configuration of the eggs assures that at the rear side of each chute, the egg which is leading will tend to more effectively displace the second egg, which may be almost as far advanced, but is never identically spaced in a lateral sense along the chute in which the pair of eggs is moving.

Each of the chutes 42 is backed against the forward side of one of the shell cracker housings 40. The construction of each of the shell cracker housings 40 can be best understood by referring to FIGS. 4, 6, 9 and 10A–10I of the drawings. In referring to these figures, it will be noted that the shell cracker housing 40 is of generally right parallelepiped configuration, having four side walls 40a–40d and a pair of end walls which may be referred to as a forward end wall 40e and a rear or discharge end wall 40f. The forward end wall 40e functions as a stop for eggs gravitating down the respective adjacent chute 42, and arrests further movement of the eggs toward the discharge end of the machine. The forward wall 40e has an opening 112 formed therethrough adjacent an opposed pair of the side walls 40b and 40d of the housing 40. Adjacent this opening is an egg pickup scoop 114 extending forwardly from the forward wall 40e of the housing 40. The egg pickup scoop 114 is positioned in relation to the opening 110 so that the scoop trails or follows the opening when the direction of rotation of the egg cracker housing 40 is considered as hereinafter explained.

Positioned interiorly of each egg cracker housing 40 are a series of guide plates which, though individually straight, collectively tend to form a helix within the housing for guiding eggs to be cracked through this housing as the housing is rotated. In order to facilitate the explanation and description of the manner in which the egg cracking section 18 of the apparatus of the invention functions, the guide plates disposed within each egg cracker housing 40 have been designated by the letters A–L as such plates are shown in FIGS. 9 and 10A–10I.

Also located within each egg cracker housing 40 and secured to certain side walls thereof at selected locations between various of the guide plates A–L are a plurality of serrated breaker or cracker bars 120. One of the cracker bars 120 which is utilized in the cracker housing 40 is illustrated in detail in FIG. 11. It will be noted that the serrated bar 120 is rather elongated in configuration, and has a plurality of serrations formed in one surface thereof to provide bumps or teeth against which the eggs to be cracked are rolled as the cracker housing 40 is rotated about an axis passing therethrough as hereinafter described. I have found that for effective cracking action, the distance separating the teeth at their crests should be from about 0.5 to about 1.12 inches. The serrated cracker bars 120 are preferably disposed so that there are three of the cracking bars disposed on three different sides of each housing 40 which are first encountered by the egg as it enters the housing. In other words, these three initial cracker bars 120 are located between the forward wall 48 of the housing and the guide plates A, B and C as shown in FIG. 9 (of the drawings. In the next section of each housing 40, as defined by plates A and E, B and F, and C and G, and D and H, two of the breaker bars are disposed on two adjacent walls of the housing. I have determined that this arrangement of the breaker bars 120 results in the most effective cracking or shattering of the shell of eggs moved through the egg cracking housing 40, without damage to the albumin or yolk of the egg. This action will be further described hereinafter.

Each of the egg cracker housings 40 is supported on a hollow shaft 122 extended centrally through each housing (between the guide blades A–L). Each of the supporting shafts 122 extends through a reinforcing collar 124 mounted on the opposite end plates 40e and 40f of each cracker housing. The end portions of each shaft 122 are journaled in suitable journals 128 and 130 carried by brackets 132 and 134 spaced from opposite ends of each cracker housing 40. A sprocket 39 is keyed to each shaft 122 where it projects from the rear end of the housing 40, and each of the sprockets 39 is driven in rotation by a drive chain 38 from one of the motors 36 supported on a suitable subframe 136 which extends over the several egg cracker housings 40. In this way, each of the egg cracker housings is driven in rotation about a central rotational axis and the effect is to cause the eggs to roll along the sides thereof, and in so rolling, to be moved from one end of the housing to the other by the generally helically oriented guide plates A–L.

The shaft 122 extending through the center of each of the cracker housings 40 is hollow and is provided with a plurality of perforations in the part of the shaft located inside the respective housing, and the downstream end of each shaft (adjacent the respective sprocket 39) is connected through a suitable seal to a water injection manifold designated generally by reference numeral 140. The water injection manifold 140 includes a distribution pipe 142, and a plurality of branch pipes 144 connected to the several supporting shafts 140. In the illustrated embodiment of the invention, both the pipe 142 and the pipes 44 may be supplied with water from a common supply line 146 as shown in FIG. 4.

The rear wall 40f of each egg cracker housing 40 is also provided with an opening so that eggs may be discharged from the housing onto a conveyor assembly 146 forming a portion of the shell removal and cleaning section 20. The eggs are guided from the cracker housing 40 onto the conveyor assembly 146 by a downwardly inclined guide plate 147.

The guide plate 147 is positioned above the upstream end of the conveyor assembly 146 which includes a pair of endless chains 148 extending over sprockets 149 (see FIG. 2) and disposed on opposite sides of the apparatus and extending horizontally and parallel to each other. The chains 148 rotatably journal opposite ends of a series of rollers 150 which are each rotatable about a horizontally extending axis. The rollers 150 are spaced sufficiently close to each other that the eggs cannot fall through the rollers. For the purpose of driving the endless chains 148 in a direction to move the rollers 150 and eggs carried thereon toward the discharge end of the apparatus and away from the shell cracker housings 40, a drive sprocket 152 is provided on the outer end of a shaft 154 which is keyed to a transversely aligned pair of the sprockets 149. The sprocket 152 is driven by a chain 158 forming a portion of the drive system 72.

A plurality of longitudinally extending wash pipes 160 having perforations formed in the lower side thereof extend over the conveyor assembly 146 above the rollers 150 for the purpose of jetting a saline or chlorinated solution of water onto eggs carried on the conveyor assembly 146 as hereinafter described. The wash pipes 160 are connected to a supply pipe 162 which is fed by pipes 164 and 166 from a suitable supply (not shown) of the treated water.

Mounted within sidewalls 168 of a housing 169 in which the conveyor assembly 146 is mounted are a pair of angle iron tracks 170 which function to support the carriage 34 hereinbefore described. The carriage 34 carries wheels 172 which ride upon the angle iron tracks 170 so that the carriage 34 may be reciprocated by the motor 28 through the crank arm 29, the pitman 30 and connecting arm 32 in the manner hereinbefore described. The carriage 34 includes a pair of horizontally spaced frame members 174 supported by the wheels 172 and each having an upper surface which carries a rubber contact strip which is in contact with the lower side of the rollers 150. The reciprocating stroke of the carriage 34 is such that, by the movement of the carriage in one direction, the rollers with which it comes in contact are rotated through 380° in (a little more than a full revolution). As the carriage 34 is reciprocated in the opposite direction, rotation of the rollers occurs through 380° in the opposite direction. The frame members 174 of the carriage are joined together by a pair of bars 180 which extend transversely between the frame members to make a rectangular framework supported on the wheels 172. The transversely extending bars 180 afford no impediment to the passage of shell particles which are removed from the eggs by water and the rolling action of the rollers 150. Eggshells and water may also pass down through the rollers before passage between the transverse bars 180.

The particles of eggshells and the water gravitate onto a pan structure designated generally by reference numeral 184 stationarily positioned under the tracks 170 and carriage 34 within the housing 169. The pan structure 184 extends between the side walls 168 and passes through one of the side walls to a converging spout portion 186. The spout portion 186 is connected to a suitable vacuum removal system (not shown) which sucks the eggshells and water out of the pan structure and discharges them at a suitable location.

At the end of the conveyor assembly 146, the hard cooked eggs from which the shells have been completely removed are discharged onto a suitable discharge plate 188, and the eggs gravitate down this plate onto any suitable conveyor system which permits them to be conveyed to a packing location where they may be removed from such conveyor system and packed for shipment and sale.

OPERATION

In the operation of the apparatus of the invention, eggs which are to be automatically hard cooked and shelled by passage through the apparatus are first loaded upon the conveyor assembly 66 located in the cooking section 12. As has previously been stated, the eggs are located in sockets formed by curved portions of paired serpentine bars 80 which extend between the parallel endless chains 68. As the several pairs of serpentine bars 80 pass around the sprockets 70 at the upstream or entry end of the apparatus, an egg is placed in each of the six sockets formed by each pair of serpentine bars. The bars 80 then commence to more downwardly along the inclined feed run of the conveyor assembly 66.

When the eggs are placed in the sockets formed between pairs of serpentine bars 80, it is endeavored to place them in an upright position in which the axis of the egg extends vertically. Some of the eggs will, however, occasionally be turned on their sides more than is desirable. To the end of righting these eggs, and placing them in a position in which their axes extend vertically, the righting plates 82 function to gradually and gently wedge any side-supported egg to an upright position without jostling it out of the socket, and without breaking or marring the egg. This righting action accomplished by the righting plate 82 occurs due to the gradual twist in the planar surfaces of the righting plates which are contacted by the eggs, so that eventually the righting plates, which are paired extend parallel to each other at their downstream ends. It is important that the eggs be righted in the manner described since I have found that when such righting is not accomplished, the yolks of the eggs tend to move relatively closer to one side of the shell than the other (that is, become off center) and this interferes with the subsequent functions of the machine in freezing the interior of the egg and then removing the shells from the egg without the occurrence of damage.

The righted eggs positioned in the sockets formed by the serpentine bars 80 continue their movement downwardly along the inclined feed run of the conveyor assembly 66 until they encounter the water 64 contained within the open topped housing between the side walls 60. The water 64 is heated to a temperature of from about 160° F to about 210° F, and is effective at this temperature to hard cook the eggs during the time they are in contact with the water. The eggs are immersed in the water as the serpentine bars 80 are moved into the central, substantially horizontal run. Prior to the emersion of the eggs from the hot water on the upwardly inclined discharge run of the conveyor assembly 66, the eggs are hard cooked and suitable for consumption.

The eggs carried in the sockets between the paired serpentine bars 80 are gently tumbled from these bars as the chains 68 of the conveyor assembly 66 pass over the sprockets 70 at the downstream end of the conveyor assembly. As the eggs move off of this conveyor assembly, they are received by the conveyor assembly 100. On this conveyor assembly, the eggs come to rest between pairs of horizontally spaced, substantially parallel rollers 106. The rollers 106 are mounted for free rotation between the chains 102, and the eggs are free to shift about on the conveyor assembly 100 as a result of the freedom of movement of the rollers. As the eggs are carried along the conveyor assembly 100, they are subjected to the impingement thereon of relatively cool water which is sprayed over the upper surface of the eggs from the perforated piping 44. The function of this spraying is to precool the eggs before subjecting them to the freezing which is accomplished in the freezing section 16.

As the eggs are moving through the precooling section 14 and subjected to spray from the perforated piping 44, they are also moved convergently slightly by the paired guide plates 108 which are supported over the conveyor assembly 100 by a suitable supporting framework designated generally by reference numeral 190. The guide plates 108 not only function to move the paired eggs toward each other so that they may be more easily transferred to the chutes 42, as hereinafter described, but the guide plates also function, with the stream of water jetted against the eggs, to cause some movement of the eggs on the rollers 106 so that cooling of the eggs is more uniform over their entire peripheral surface.

After passage through the precooling section 14, the eggs enter the freezing section 16 in which they are subjected to contact with a refrigerant, such as cold glycerin. The glycerin has been chilled to a temperature which preferably is at least 0° C and which may be considerably lower in temperature. In any event, the cold refrigerant is sprayed from the spray heads 45 onto the eggs, and contact is maintained over a sufficient time period, considering the speed of movement of the conveyor assembly 100, that freezing of at least the membranes of the eggs occur. The membranes are located between the shell and the albumin of the egg. Relatively close control of the freezing which occurs at this point is important in the treatment of the eggs, and it is desirable that freezing not occur to an extent such that the albumin is frozen more than one quarter inch inwardly of the shell of the egg.

The eggs move from the discharge end of the conveyor assembly 100 into a plurality of chutes 42, with three of such chutes being provided for the purpose of receiving pairs of eggs in the illustrated embodiment of the invention. As two eggs enter their respective chute 42, the eggs then gravitate down the inclined scoop portion 42a toward the discharge side of each chute. In undergoing this movement, the egg which is the heavier of the two tends to move ahead of, or lead, the lighter of the two eggs. In any event, the configuration of the chute 42 results in one of the eggs resting against the stop constituted by the forward wall 40e of the respective cracker housing 40 which is associated with each of the chutes 42, and the other egg being spaced outwardly from this forward wall of the cracker housing by the egg resting thereagainst. This action of the chutes 42, which may be properly described as a seriating action, places the paired eggs in a relationship to each other so that first one egg may be picked up and moved into the cracker housing, and then the other egg may be moved into the cracker housing.

When the eggs have come to rest in the position described at the downstream end of each of the chutes 42, the egg which is in contact with the forward wall 40e of the respective cracker housing 40 is then moved by the egg pickup scoop 114 through the opening 112 formed through the forward wall 40e of the cracker housing. As the egg moves through this opening into the cracker housing 40, it comes to rest inside the housing on one of the sidewalls 40a of the housing. It is confined to this position by the forwardmost guide plate A of the series of guide plates A–K which are disposed in the cracker housing in the manner hereinbefore described. There is secured to the sidewall 40a of each cracker housing 40, a serrated cracker bar 120 of the type illustrated in FIG. 11.

As the cracker housing 40 is driven in rotation on the hollow supporting shaft 122 in the manner hereinbefore described, the egg is caused to roll about the walls of the housing in the manner shown in FIGS. 10A–10I. Thus, upon entry into the cracker housing, the egg rests in substantially the position shown in FIG. 10A. Here it is contact with the teeth or serrations on the serrated cracker bar 120, and as the cracker housing 40 continues to rotate, the egg gravitates down the side 40a of the housing and in doing so, bumps against the serrations or teeth provided on the cracker bar. This action is sufficiently concussive that cracks are developed in the shell of the egg, but is not so violent that the shells are driven into the albumin, nor, in fact, is the frozen perimeter of the egg broken through. Thus, there tends to be developed over the entire peripheral surface of the egg a series of cracks.

The cracks are further extended and more extensively developed as the cracker housing continues to rotate. Thus, after the housing has rotated through about 90° as shown in FIG. 10C, the egg is then resting on side 40b of the cracker housing and is ready to traverse this side as the cracker housing continues to rotate to the position shown in FIG. 10D. A second serrated cracker bar 120 may or may not be located on the side 40b of the cracker housing, depending upon the extent of cracking which may be desired or tolerated at the particular speed at which the cracker housing is rotated. The cracker bars 120 are preferably easily detachable from the side walls 40a–40d of the cracker housing 40 between the various sections A–K of the guide plates, so that adjustment in cracking severity may be made in correlation to the speed of operation which is effected. As the cracker housing 40 continues to rotate, the egg moves along the several side walls 40a–40bq as shown in FIG. 10 until, as shown in FIG. 10H, the egg has rolled down the sidewall 40d and has been guided behind the first plate A of the series of guide plates A–K. As the cracker housing 40 continues its rotation, the second egg which was previously behind the first of the tow eggs within the chute 40 has moved up into juxtaposition to the forward side 40e of the cracker housing and is ready to be picked up.

Upon completion of one complete revolution by the cracker housing 40, this second egg is then moved by the scoop 114 through the opening 112 so that it comes to occupy the position within the cracker housing 40 which was previously occupied by the first of the eggs in the pair. It may be commented that the course of this first egg (shown in dashed lines in FIGS. 10H and 10I) through the cracker housing 40 continues to be by way of movement along the several sidewalls 40a–40d of the housing, and that serrated cracker bars 120 are provided on these walls at the needed locations in order to effect thorough cracking of the shell of the egg. I have found that frequently it is desirable to place cracker bars 120 only between the first few guide plates located within the cracker housing, and to permit the eggs to simply tumble from wall to wall in the downstream portion of each cracker housing. The result of the passage of the eggs through the cracker housing 40 is to thoroughly crack the shells of the eggs, and make such shells removable by fluid impingement in a manner hereinafter described. Also, I have found that the cracker housing 40 structured in the manner described can effect such cracking without damage to the interior of the egg so that it is in this section of the apparatus that the greatest improvement in efficiency of production of the shell-less hard cooked eggs is realized. Some of the shell fragments will be detached from the eggs and will remain in the cracker housing 40. The housings may be periodically cleaned and sterilized by introducing saline water of the like to the interior of the housings by way of the perforations in the hollow supporting shafts 122.

After the eggs have transited their respective cracker housings, they move out of a suitable opening provided in the downstream end wall 40f of the housing, beneath the guide plate 147 and onto the conveyor assembly 146. Upon moving onto the conveyor assembly 146, the eggs attain a temporary rest position between the pairs of rollers 150. These rollers are not dead rollers as are those constituting a portion of the conveyor assembly 100 located in the precooling section 14, but rather are actuated by the reciprocating movement of the carriage 34 hereinbefore described. Thus, with the eggs resting upon the rollers 150, these rollers are then subjected to rotation through slightly more than a complete revolution (380°), first in one direction, and then in the opposite direction, as the carriage 34 reciprocates. This back-and-forth rolling action of the rollers 150 accomplishes any further cracking of the already cracked shells which may be necessary in order to permit the shells to be washed from the cooked eggs by a stream of antiseptic wash water directed against the eggs from the wash pipes 160. As previously stated, the water which is directed against the eggs from these wash pipes may be a saline solution, or may be chlorinated, to assure that any bacteria which may be present in the eggs is destroyed, and so that the eggs are cleaned. The fragmented shells are washed from the eggs by the stream of water directed thereagainst, and shells and water pass downwardly between the rollers 150 and through the open framework of the carriage 34 to come to rest upon the pan structure 182. Here the water flows the shell particles down the inclined surface of the pan structure 182 to the spout portion 186 where water and shells are sucked up and discharged.

The clean, shell-less hard cooked eggs move off of the conveyor assembly 146 onto the downwardly inclined discharge plate 188. Another conveyor (not shown) may receive the eggs from the discharge plate 188 for removal to a packing station, or the eggs may be manually removed from the plate.

Although a preferred embodiment of the invention has been herein described by way of example, it is to be understood that various modifications and changes can be effected in the structure without departure from the basic principles which underlie the invention. Changes and modifications of this type are therefore deemed to be circumscribed by the spirit and scope of the invention except as the same may be necessarily limited by the appended claims or reasonable equivalents thereof.

What is claimed is:

1. Apparatus for preparing shell-less hard cooked eggs comprising:
   first conveyor means;
   means for cooking eggs moving on said first conveyor means;
   means for cooling the eggs moving on the conveyor means after the eggs have been cooked;
   means for freezing eggs moving on the conveyor means after the eggs have been cooled;
   an egg-cracking device positioned to receive eggs from the conveyor means, said device including:
   a housing;
   means for rotating the housing; and
   means in the housing for cracking eggs contacted therewith as the housing is rotated;
   a second conveyor means positioned for receiving cracked eggs from said housing; and
   means for directing a fluid against eggs carried on said second conveyor means.

2. Apparatus for preparing shell-less hard cooked eggs as defined in claim 1 wherein said cooking means comprises a housing around a portion of said first conveyor means and configured to contain a heated liquid immersing said portion of said first conveyor means.

3. Apparatus as defined in claim 2 and further characterized as including a burner under the housing which is around a portion of said first conveyor means.

4. Apparatus for preparing shell-less hard cooked eggs as defined in claim 1 wherein said cooling means comprises means for placing a liquid on eggs moving on said first conveyor means after said eggs have passed said cooking means.

5. Apparatus as defined in claim 4 wherein said means for placing a liquid on eggs moving on said first conveyor means comprises perforated piping for spraying a relatively cool liquid on the eggs from points above said first conveyor means.

6. Apparatus for preparing shell-less hard cooked eggs as defined in claim 1 wherein said freezing means comprises a device for gravitating a liquid refrigerant onto said eggs.

7. Apparatus as defined in claim 1 wherein said conveyor means comprises:
   a pair of endless, substantially parallel chains;
   sprockets drivingly engaging the chains;
   rollers extending between the chains and carried thereby;
   means supporting each roller for rotation about a horizontal axis; and
   reciprocating means contacting the peripheries of the rollers for rotating the rollers, first in one direction, then in the opposite direction, as said rollers are moved in translation by said chains.

8. Apparatus as defined in claim 7 wherein said reciprocating means comprises:
   a carriage in contact with the underside of at least a portion of said rollers;
   wheels mounted on said carriage;

tracks supporting said wheels for movement of the carriage therealong; and a motor drivingly connected to said carriage for reciprocating said carriage back and forth along said tracks.

9. Apparatus as defined in claim 1 wherein said first conveyor means comprises;
a pair of endless, substantially parallel chains;
a plurality of serpentine bars extending between and connected to said chains and defining a plurality of egg sockets.

10. Apparatus as defined in claim 9 and further characterized as including righting plates extending over and cooperating with said serpentine bars for righting eggs carried in said egg sockets.

11. Apparatus as defined in claim 10 wherein said second conveyor means comprises:
a pair of endless, flexible supporting elements extending substantially parallel and horizontally spaced from each other;
means drivingly engaging each of said supporting elements;
rollers extending between said supporting elements and each journaled for rotation about a horizontal axis; and
means for driving said rollers in rotation alternately in a first direction, then a second direction.

12. Apparatus as defined in claim 11 wherein said means for cracking eggs contacted therewith comprises a plurality of serrated cracker bars secured to the internal walls of the housing.

13. Apparatus as defined in claim 1 and further characterized to include a chute positioned between said first conveyor means and said egg-cracking device and configured to gravity seriate eggs moving along said chute toward said egg-cracking device.

14. Apparatus as defined in claim 13 and further characterized as including guide means for guiding pairs of eggs into said chute.

15. Apparatus as defined in claim 1 and further characterized as including means cooperating with said first conveyor means for standing eggs on one end before the eggs are cooked by said cooking means.

16. Apparatus as defined in claim 15 wherein said cooperating means comprises a plurality of righting plates defining channels through which eggs are moved on said first conveyor means, said righting plates each being twisted through an angle over their lengths to provide an egg-contacting surface extending at an angle to the horizontal where first contacted by an egg as said first conveyor means is moved, and extending substantially vertically where last contacted by the egg.

17. Apparatus as defined in claim 1 and further characterized as including means for delivering a cleaning fluid to the interior of the housing of said egg-cracking device.

18. Apparatus as defined in claim 1 wherein said means in the housing for cracking eggs comprises a plurality of serrated cracker bars secured to the internal walls of the housing and having radially inwardly directed serrations thereon.

19. Apparatus as defined in claim 1 and further characterized as including guide plates in said housing of the egg-cracking device and helically arranged to provide a spiral path from one end of said housing to the other.

20. Apparatus as defined in claim 1 and further characterized as including means below said second conveyor means for receiving shell particles removed from eggs on said second conveyor means and removing said shell particles from the remainder of the apparatus.

21. Apparatus as defined in claim 1 wherein said first conveyor means comprises:
a first conveyor assembly for moving eggs through said cooking means; and
a second conveyor assembly positioned to receive eggs from said first conveyor assembly and for moving eggs past said cooling means and said freezing means.

22. Apparatus as defined in claim 1 wherein said egg-cracking device is further characterized as including:
cracker bars lining at least a portion of the internal wall of said housing; and
guide plate means projecting inwardly from the internal wall of said housing into the interior and to a greater distance than said breaker bars project into said housing, said guide plate means forming a channel extending from one end of the housing to the other.

23. Apparatus as defined in claim 22 wherein said housing is rectangular in cross section, having four walls and tow opposed ends, and said guide plate means includes a plurality of plates spaced along each of the walls thereof and each extending at an angle to an axis extending through said housing from one end thereof to the other.

24. Apparatus as defined in claim 23 wherein said breaker bars are serrated bars having teeth projecting inwardly in the housing, said bars being secured to the walls of said housing between said plates.

25. Apparatus as defined in claim 24 wherein three of said serrated bars are disposed on three of said walls and adjacent one end of said housing.

26. Apparatus as defined in claim 23 wherein said machine is further characterized as including a pickup scoop secured to one end of said housing and contiguous to one end of the channel formed by said guide plate means for picking up and feeding eggs to said channel.

27. Apparatus as defined in claim 1 wherein said means for directing a fluid against eggs carried on said second conveyor means comprises perforated pipes extending over said second conveyor means.

28. Apparatus as defined in claim 1 wherein said second conveyor means includes means for rotating cracked eggs while fluid is directed thereagainst by said fluid directing means.

29. Apparatus for automatically cooking and shelling eggs comprising:
means for moving eggs continuously along a path through the apparatus;
means adjacent a portion of said moving means for cooking eggs during their movement thereon;
means for freezing the portion of the eggs immediately inside the shells thereof and to a depth not exceeding about 1/4 inch as the eggs are moved by said moving means away from said cooking means;
means for cracking the shells on the moving eggs while the portion of the eggs immediately inside the shells remains frozen; and
means for removing the cracked shells from the remainder of the eggs while the eggs are being moved on said moving means.

30. Apparatus as defined in claim 29 wherein said moving means includes:
a spiral path defined about a rotational axis by
sidewall means around said axis;
guide plates helically arrayed within said sidewall means and secured to said sidewall means; and
means for rotating said sidewall means and guide plates about said axis to cause eggs to follow said spiral path; and
wherein said cracking means comprises bars carrying protuberances secured to said sidewall means and positioned for contact with eggs moving along said spiral path.

31. Apparatus as defined in claim 29 wherein said means for removing the cracked shells comprises rotating elements alternately rotating first in one direction then in another direction while in contact with the eggs having cracked shells.

32. Apparatus as defined in claim 29 and further characterized as including means for automatically erecting each egg on said moving means to an upright position in which the axis of each egg extends vertically.

33. Apparatus as defined in claim 29 wherein said moving means includes means for gravity seriating eggs to move a plurality of eggs from a position of movement abreast to a position of movement in a line along the direction of movement.

PO-1050
(5/69)

UNITED STATES PATENT OFFICE
CERTIFICATE OF CORRECTION

Patent No. 3,603,243        Dated September 7, 1971

Inventor(s) Robert D. Foster

It is certified that error appears in the above-identified patent and that said Letters Patent are hereby corrected as shown below:

In column 3, line 66, change "heating" to --heated--.

In column 6, line 47, delete the word "in" after 380°.

In column 9, line 15, change "tow" to --two--.

In column 9, line 45, change "of the like" to --or the like--.

In claim 7, line 60, before the word "conveyor" insert --second--.

In claim 22, column 12, line 3, insert --thereof-- after the word "interior".

In claim 23, column 12, line 8, "tow" should be --two--.

Signed and sealed this 18th day of April 1972.

(SEAL)
Attest:

EDWARD M.FLETCHER,JR.
Attesting Officer

ROBERT GOTTSCHALK
Commissioner of Patents